United States Patent [19]

Dunham

[11] 4,046,390

[45] Sept. 6, 1977

[54] DEAD STOP STEP CHUCK

[75] Inventor: Russell H. Dunham, New Fairfield, Conn.

[73] Assignee: The Dunham Tool Company, Inc., New Fairfield, Conn.

[21] Appl. No.: 662,158

[22] Filed: Feb. 27, 1976

[51] Int. Cl.² .......................................... B23B 31/20
[52] U.S. Cl. ................................. 279/1 S; 279/1 SJ; 279/51
[58] Field of Search ............. 279/51, 46 R, 1 SJ, 279/1 S, 1 Q

[56] References Cited

U.S. PATENT DOCUMENTS

| | | | |
|---|---|---|---|
| 1,125,780 | 1/1915 | Waite | 279/51 |
| 2,346,706 | 4/1944 | Stoner | 279/46 |
| 2,994,539 | 8/1961 | Farnsworth | 279/51 |
| 3,188,101 | 6/1965 | Westberg | 279/46 X |
| 3,385,607 | 5/1968 | Hughes | 279/46 X |
| 3,411,796 | 11/1968 | Decker | 279/46 |
| 3,539,193 | 11/1970 | Parsons | 279/51 |
| 3,687,468 | 8/1972 | Skahen | 279/51 |
| 3,691,900 | 9/1972 | Novak et al. | 279/1 A X |
| 3,779,566 | 12/1973 | Tarbox et al. | 279/51 X |

Primary Examiner—Francis S. Husar
Assistant Examiner—William R. Briggs
Attorney, Agent, or Firm—Mandeville and Schweitzer

[57] ABSTRACT

An emergency chucking assembly is provided with a dead stop feature which prevents drawback when closing the collet. The assembly does not require a special collet to achieve the dead stop feature and can be used on any conventional collet, such as a one inch 5C collet. This is achieved by providing a spring biased mounting which forces the front face of the collet against and into an annular recess in the rear face of the enlarged chuck, so that when the drawtube is activated and the collet closed, the step chuck cannot move with the collet. The moving collet forces the jaws of the chuck to collapse around the workpiece held. The invention includes the utilization of an elastomer plug inserted at the juncture of the slots in the chuck body, which plug extends axially from the rear ends of the radial slots forward to the point of deepest machining of the chuck body to receive the workpiece. The plug improves the spring temper effect to the assembly.

6 Claims, 3 Drawing Figures

DEAD STOP STEP CHUCK

STATEMENT AND BACKGROUND OF THE INVENTION

This application is related to application Ser. No. 648,460, filed Jan. 12, 1976, which is hereby incorporated by reference in its entirety. This invention relates to an emergency dead stop step chucking assembly for conventional collets, which assembly is configured to be utilized without the need for a specially designed collet. The assembly of the invention is particularly appropriate for use in the handling of workpieces of short length. Moreover, the arrangement of the invention is such that variations in the diameter of the part will not affect the positive end length control of the workpiece. The chucking assembly of the invention is comprised of a soft metal which may be easily machined to fit any part diameter up to, for example, two inches for a standard one inch 5C collet, with 0.75 inch chucking length, while still preventing workpiece drawback on the closing of the collet.

This is achieved by providing a step chuck with an enlarged forward portion, with a shank extending from the rear face thereof which fits into the bore of a conventional collet. The assembly includes a spring collar which is inserted into the rear end of the collet bore, which spring collar is held in place with a spring biased shoulder screw. Thus, the collet front face is spring biased against the rear face of the enlarged forward portion of the chuck body. In this connection, the rear face of the collet body includes an annular recess for receiving the front end of the collet.

The rearwardly extending shank of the chuck body includes a radially extending orienting pin, which cooperates in sliding engagement with one of the circumferentially spaced longitudinally extending slots in the collet to prevent relative rotation between the chuck body and the collet. Also included herewith is a circumferential reminder "groove" on the enlarged chuck body to delineate the maximum depth allowable for boring to receive the workpiece in the chuck.

The rearwardly extending shank portion of the chuck body includes an axial bore, which is threaded near the rear end thereof to receive the shoulder screw of the holdback spring of the assembly. Moreover, this bore extends forwardly through the entire shank and into the enlarged forward body of the chuck. It thus serves as an access for minor machining of the radially innermost portions of the jaws of the chuck body at the intersecting points thereof in order to provide a small bore extending through the chuck body up to the point of the reminder groove. By providing this bore, a resilient plug may be inserted through the bore up to the point of the reminder groove. This resilient plug serves to impart to the chuck assembly of the invention a spring tempered property not ordinarily existing in emergency chucking assemblies comprised of soft metal. This "spring temper effect" enhances the gripping action of the chuck as the jaws thereof collapse around a workpiece inserted into the bore machined or turned into the chuck body for receiving the workpiece.

Thus, when the assembly of the invention is made up on a conventional collet and connected to a drawtube, the closer may be activated to hold the spacer pins tightly positioned in longitudinally extending slots of the chuck body. Then, the front face thereof may be turned or bored to the largest part diameter allowed by tolerances on the part diameter and the release closer activated to release pressure on the spacer pins. Subsequently, after the spacer pins are removed and any cleaning of the prepared bore completed, the chucking assembly of the invention is ready for receiving the workpiece.

With the foregoing objects in view, this invention will now be described in more detail, and other objects and advantages thereof will be apparent from the following description, the accompanying drawings, and the appended claims.

DETAILED DESCRIPTION OF THE INVENTION

Figure 1:
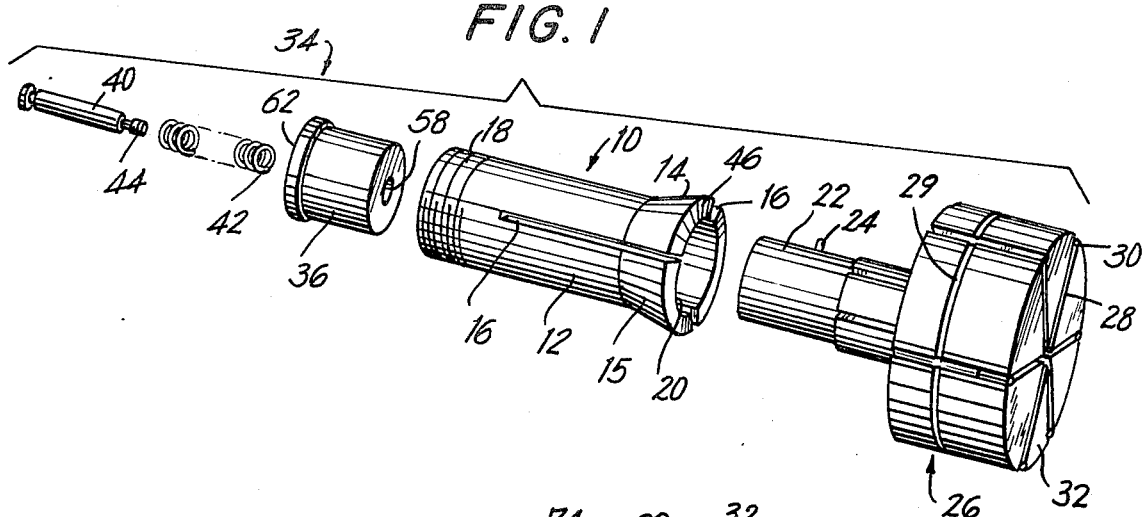
FIG. 1 is an exploded perspective view of the chucking assembly of the invention, showing the various parts thereof positioned in relation to a conventional collet.

Referring to the drawings in which like reference numbers refer to like parts throughout the several views thereof, 10 designates generally a collet which may be a conventional one inch 5C collet with a tubular body portion 12 and a flared front portion 14 forming a camming surface 15, which cooperates with camming surface 72 (FIG. 2) of a lathe spindle 70. As can be seen in FIG. 1, collet 10 is externally threaded as at 18 adjacent the rear end thereof to receive a drawtube, not shown, of a machine tool lathe.

Cooperating with the internal bore 20 of collet 10 is a shank 22 of the forward jaw portion, designated generally 26 of the chucking assembly of the invention. Shank 22 has a radially extending pin 24, which cooperates in sliding engagement with one of the longitudinally extending slots 16 of collet 10. Thus, pin 24 cooperates with the walls of one of slots 16 to prevent a relative rotation between collet 10 and jaw portion 26.

Figure 3:
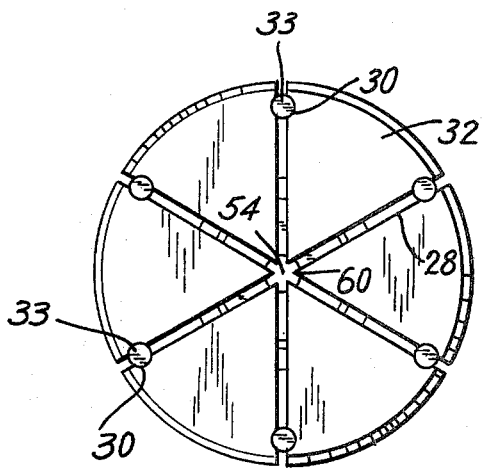
FIG. 3 is a front view of the assembly as viewed from the right in FIG. 2.

As can be seen in FIG. 1, jaw portion 26 is divided by a plurality of circumferentially spaced longitudinally extending slots 28 forming jaws 32. Each of the slots 28 have formed in them, opposed recesses 30 (FIG. 3), for receiving pins 33 therein. A reminder groove 29 is formed in jaw portion 26 to delineate the maximum depth allowable for boring in the front face of jaw portion 26 to receive a workpiece.

Figure 2:
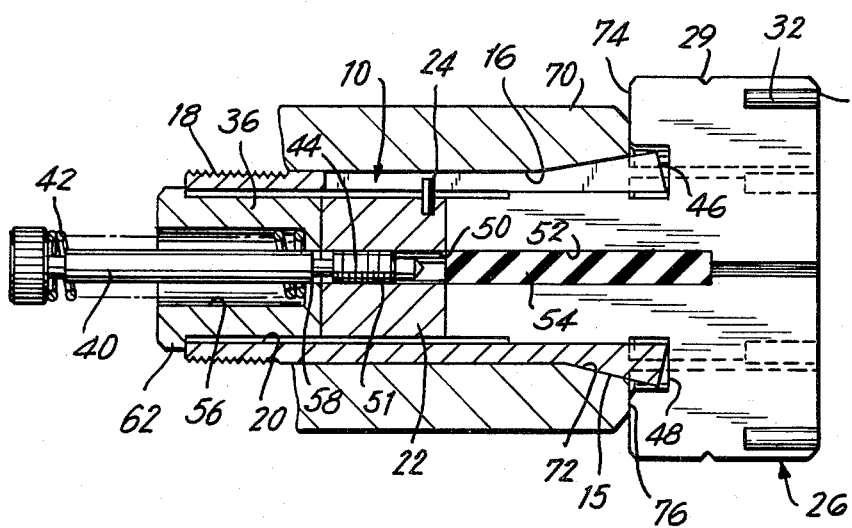
FIG. 2 is a longitudinal sectional view of the assembly of the invention in its assembled form.

As can be seen in FIGS. 1 and 2, the rear portion of the assembly of the invention, designated generally 34 in FIG. 1, includes a spring collar 36, having an annular flange 62. As can be seen in FIG. 2, spring collar 36 fits in bore 20 of collet 10 at the rear end thereof, with annular abutment 62 cooperating with the rear end face of collet 10 to determine the degree of insertion of spring collar 36 in collet 10.

As can be seen in FIG. 2, spring collar 36 has a bore 56 and a counterbore 58. Moreover, shank portion 22 has a bore 50 with a threaded portion 51. Thus, shoulder screw 40 with a threaded forward shank 44 passes through a spring 42, bore 56, counterbore 58, and the threaded shank 44 cooperates with threads 51 of bore 50 in shank 22. The rear face of jaw portion 26 has an annular recess 48, which cooperates with the front face 46 of collet 10. Spring 42 received into bore 56 of spring collar 36 forces the front face 46 of collet 10 to bear against the face of annular recess 48.

Thus, after the assembly is made with the parts positioned as shown in FIG. 2, the front face of the forward jaw portion 26 of the assembly of the invention is machined or turned and bored to "customize" it for receiving a workpiece to be worked upon. After the usual cleaning of the bore and slots and the removal of the spacer pins 33, and with the drawtube connected to the threads 18 of the collet, the closer is activated with the workpiece received in the customized bore made in the jaw portion 26. With this activation, collet 10 moves to the left, as shown in FIG. 2. With this movement, the camming surface 72 of spindle 70 cooperates with camming surface 15 of collet 10 to cause the jaws of collet 10 to move radially inwardly. However, the rear face 74 of jaw portion 26 is abutted against the front face 76 of spindle 70, preventing jaw portion 26 from moving to the left upon activation and movement of collet 10. Because of this, and because of the radially inward movement of the jaws of collet 10, the jaws 32 of the jaw portion 26 collapse around the workpiece being held. The back of the bore holding the workpiece of the jaw portion 26 acts as a non-drawback dead stop to prevent axial part movement of the workpiece as the chuck fully closes to grip the part firmly.

As a further aspect of this invention, and prior to assembling the parts in the manner shown in FIG. 2, the bore 50 in shank portion 22 is used as an access to bore out slightly the axial portion of jaw portion 26 at the juncture where the radial slots 28 intersect, so that the innermost point 60 of each jaw 32 (FIG. 3) is removed, to form a central bore 52 in front portion 26. After this is done, an elastomer plug 54 is inserted through bore 50 and positioned as shown in FIG. 2. This elastomer plug 54, which may be of any natural or synthetic rubber, for example, such as a chloroprene rubber (Neoprene, a product of DuPont) serves to impart to the jaw portion 26, a spring tempered effect ordinarily available only with chucks comprised of hardened steel. As will be appreciated, this imparts to the jaws 32, an enhanced gripping action for holding the workpiece in a positive manner, and is particularly appropriate for holding workpieces of very short length which may have minor part diameter variations.

Thus, as will be apparent from the foregoing, this invention provides a new dead stop step chuck which may be used with any conventional collet such as, for example, a one inch 5C collet, and which provides positive end length control with no drawback upon closing of the collet. Moreover, minor parts diameter variations will not affect the workpiece or part length being worked upon. Because six gripping sections or jaws are provided, a more uniform holding with less part distortion is achieved. The arrangement, in accordance herewith, may be quickly mounted without any special adapters to fit collet spindles and may be easily machined to fit the part diameter involved.

As will be understood by practitioners in the art, because the assembly of the invention can be used with conventional 5C collets, for example, and because parts up to 2 inches in diameter may be chucked with up to 0.75 inch chucking length with no part drawback in the closing, the assembly of the invention is exceptional in reducing costs for each production run of a particular part. Moreover, because of the use of the elastomer plug, the "spring back" or tempered effect of the chuck body of the assembly of the invention is substantially the same as that for conventional chucks comprised of hardened steel. In this connection, the plug 54 for a standard 5C collet is about 1½ inches long and between about ⅛ inch and 3/16 inch in diameter.

While the methods and apparatus herein disclosed form preferred embodiments of this invention, this invention is not limited to those specific methods and apparatus, and changes can be made therein without departing from the scope of the invention, which is defined in the appended claims.

I claim:

1. A dead stop chucking assembly for collets, comprising
   a. a chucking body comprised of soft metal with a plurality of circumferentially spaced longitudinally extending slots therein;
   b. a tubular shank extending from the rear face of said body, adapted to be received into the front of a collet bore;
   c. a spring collar adapted to be received into the rear end of said collet bore;
   d. spring biased screw means adapted to extend through said collar and engage said shank portion in a collet in which it is inserted; the improvement characterized by
   e. said chucking body being enlarged to provide a rear spindle engaging surface;
   f. said spring collar having an annular abutment defining the extent of insertion thereof into the rear of a collet bore;
   g. a radially extending locating pin on said shank portion for longitudinal sliding engagement with a slot in a collet engaged by said assembly;
   h. an axial bore extending from the rear face of said chucking body shank forwardly to a point spaced from the front face of said chucking body;
   i. an elastomer plug received in said axial bore;
   j. said spring biased screw means and said annular abutment cooperating at the rear end of a collet in which they are inserted, for biasing the front face of said collet against the rear face of said enlarged chucking body; and
   k. said rear face of said enlarged chucking body cooperating with the front face of a spindle upon which it is mounted, preventing axial movement of said chucking body upon closure of said collet.

2. A dead stop chucking assembly for collets, comprising
   a. a chucking body comprised of soft metal with a plurality of circumferentially spaced longitudinally extending slots therein;
   b. a tubular shank extending from the rear face of said body, adapted to be received into the front of a collet bore;
   c. a spring collar adapted to be received into the rear end of said collet bore;
   d. spring biased screw means adapted to extend through said collar and engage said shank portion in a collet in which it is inserted; the improvement characterized by
   e. said chucking body being enlarged to provide a rear spindle engaging surface;
   f. said spring collar having an annular abutment defining the extent of inserted thereof into the rear of a collet bore;
   g. a radially extending locating pin on said shank portion for longitudinal sliding engagement with a slot in a collet engaged by said assembly;
   h. said spring biased screw means and said annular abutment cooperating at the rear end of the collet in which they are inserted for biasing the front face of the collet against the rear face of said enlarged chucking body;

i. said rear face of said enlarged body cooperating with the front face of a spindle upon which it is mounted, preventing axial movement of said chucking body upon closure of said collet;

j. said enlarged chucking body having an annular reminder groove on the outer surface thereof and spaced from the front face of said body to define the maximum depth for a workpiece receiving bore therein;

k. an axial bore extending from the rear face of said chucking body shank forwardly to said reminder groove; and l. said axial bore having a threaded portion at the rear end thereof for receiving said spring biased screw means.

3. The apparatus of claim 2, further characterized by
   a. an annular recess in said rear face of said enlarged chucking body for receiving the front end of a collet therein.

4. The apparatus of claim 2, further characterized by
   a. said chucking body having six longitudinally extending, circumferentially spaced slots.

5. The apparatus of claim 2, further characterized by
   a. the opposed walls of each of said longitudinally extending slots having opposed semicircular recesses forming pin receiving bores.

6. The apparatus of claim 2, further characterized by
   a. an elastomer plug in said axial bore extending forwardly from said threaded portion to said reminder groove.

* * * * *